United States Patent [19]

Michalko

[11] 3,986,984

[45] Oct. 19, 1976

[54] METHOD OF CATALYST MANUFACTURE

[75] Inventor: Edward Michalko, Chicago, Ill.

[73] Assignee: UOP Inc., Des Plaines, Ill.

[22] Filed: July 21, 1975

[21] Appl. No.: 597,955

[52] U.S. Cl. ............................... 252/439; 252/448; 252/463; 252/466 J; 252/466 PT; 252/466 B; 252/472

[51] Int. Cl.² .................... B01J 21/04; B01J 23/62; B01J 23/82; B01J 27/04

[58] Field of Search .......... 252/463, 466 PT, 466 B, 252/439, 448, 472, 466 J

[56] References Cited
UNITED STATES PATENTS

| | | |
|---|---|---|
| 3,576,766 | 4/1971 | Rausch .......................... 252/466 PT |
| 3,770,616 | 11/1973 | Kominami et al. ................. 208/138 |
| 3,779,947 | 12/1973 | Mitsche et al. ............... 252/466 PT |
| 3,825,612 | 7/1974 | Wilhelm .......................... 260/683.3 |
| 3,894,110 | 7/1975 | Drehman ...................... 252/466 PT |

*Primary Examiner*—W. J. Shine
*Attorney, Agent, or Firm*—James R. Hoatson, Jr.; Robert W. Welch; William H. Page, II

[57] ABSTRACT

A method of catalyst manufacture. A calcined tin-containing refractory inorganic oxide support or carrier material is treated in contact with an aqueous solution of a basic reagent and thereafter impregnated with a Group VIII metal component to yield a catalytic composite of improved activity.

8 Claims, No Drawings

METHOD OF CATALYST MANUFACTURE

This invention relates to the manufacture of a catalytic composite particularly suitable for use as a multifunctional catalyst. More specifically, the present invention relates to the manufacture of a multifunctional catalytic composite of a Group VIII metal component or components impregnated on a tin-containing refractory inorganic oxide, said composite having exceptional activity with respect to those hydrocarbon conversion processes comprising two or more hydrocarbon conversion reactions occurring simultaneously or substantially simultaneously, said reactions including cracking, hydrocracking, cyclization, dehydrocyclization, hydrogenation, dehydrogenation, isomerization, alkylation, and the like.

The reforming of a gasoline boiling range hydrocarbon feed stock is a classic example of a hydrocarbon conversion process comprising several simultaneously occurring hydrocarbon conversion reactions. The reforming process is a catalytic process designed to promote a number of octane-improving hydrocarbon conversion reactions effecting paraffins and naphthenes — the feed stock components which offer the greatest potential for octane improvement. The process is thus designed to promote the isomerization, dehydrogenation, hydrocracking, and especially the dehydrocyclization of paraffins. With respect to naphthenes, the principal octane-improving reaction involved dehydrogenation and ring isomerization to yield aromatics of improved octane value.

A catalytic composite comprising a Group VIII metal component impregnated on a tin-containing refractory inorganic oxide support or carrier material has been found to effect a substantial improvement with respect to the activity, selectivity, and/or stability when employed in those hydrocarbon conversion processes which typically require a multifunctional catalyst. In particular, it has been determined that a catalytic composite comprising a platinum component impregnated on a tincontaning alumina support or carrier material can be utilized to effect a substantial improvement with respect to the reforming of a gasoline boiling range hydrocarbon feed stock. The principal advantage associated with the use of the described catalytic composite is its ability to function effectively in high severity reforming operation, for example, in a low-pressure reforming operation which is more conducive to the dehydrogenation of naphthenes and paraffins — the principal octane-improving reactions.

It is generally recognized that catalysis involves a mechanism particularly noted for its unpredictability. Minor variations in a method of manufacture often results in an unexpected improvement in the catalyst product. The improvement may result from an undetermined and minor alteration of the physical character and/or composition of the catalyst product to yield a novel composition difficult of definition and apparent only as a result of substantially improved activity, selectivity and/or stability realized with respect to one or more hydrocarbon conversion reactions. For example, it has been discovered that the aforementioned tin promoted platinum catalyst, modified in the course of manufacture by a pre-impregnation treatment of the tin-containing alumina with a basic reagent, exhibits a substantial and unexpected improvement, particularly with respect to activity, under high severity reforming conditions.

It is therefore an object of this invention to present a novel method of catalyst manufacture. It is a more specific object to present a novel method of manufacturing a catalytic composite of a Group VIII metal component impregnated on a tin-containing refractory inorganic oxide carrier material to produce an improved multifunctional hydrocarbon conversion catalyst.

In one of its broad aspects, the present invention embodies a method of manufacture providing a catalytic composite of improved activity which comprises (a) preparing a calcined tin-containing refractory inorganic oxide carrier material; (b) treating said carrier material at a temperature of from about 50° to about 150° C. in contact with a basic reagent in aqueous solution for a period of from about 0.5 to about 5 hours; (c) water-washing the treated carrier material; (d) impregnating the washed carrier material with an acidic solution of a precursor compound of at least one catalytically active metallic component; and (e) drying and calcining the impregnated carrier material.

Other objects and embodiments of this invention will become apparent in the following detailed specification.

The calcined tin-containing refractory inorganic oxide utilized as a support or carrier material pursuant to the method of this invention may be prepared in any conventional or otherwise convenient manner. The tin component is advantageously incorporated in the refractory inorganic oxide by the device of solubilizing a tin compound in a sol precursor of a desired refractory inorganic oxide carrier material. The sols herein contemplated are such as are prepared by the hydrolysis of an acid salt of an appropriate metal in aqueous solution followed by a reduction in the acid anion concentration of the solution whereby olation occurs and inorganic polymers of colloidal dimension are formed dispersed and suspended in the remaining liquid. For example, the refractory inorganic oxides typically employed as carrier materials include alumina, silica, zirconia, titania, chromia, and the like, and an acid salt of an appropriate metal would therefore be such as the chlorides, sulfates, nitrates, acetates, etc., of aluminum, silicon, zirconium, titanium, chromium, and the like. More specifically, alumina is a preferred carrier material and suitable precursors thereof would be such as are prepared by the hydrolysis of aluminum chloride, aluminum sulfate, aluminum nitrate, aluminum acetate, etc., in aqueous solution, and treating the solution at conditions to reduce the acid anion concentration, e.g. the chloride anion concentration.

Reduction of said acid anion concentration may be accomplished in any conventional or otherwise convenient manner. For example, an aqueous aluminum chloride solution can be subjected to hydrolysis utilizing an electrolytic cell with a porous partition between the anode and cathode whereby an acid anion deficiency is created in the cathode compartment with the formation of the desired sol. In some cases, as with an aqeuous aluminum acetate solution, where the acid anion is sufficiently volatile, the desired reduction in anion concentration can be effected simply by heating. A particularly suitable method of preparing a sol precursor of the preferred alumina carrier material involves the use of aluminum metal as a neutralizing agent in conjunction with, for example, an aqueous aluminum chloride solution. In this instance, the salt of neutralization is itself a hydrolyzable aluminum salt subject to ultimate sol formation. One convenient and preferred method, particularly suitable for the preparation of an alumina sol, comprises digesting aluminum pellets or slugs in aqueous hydrochloric acid, and reducing the chloride anion concentration of the resulting aluminum chloride solution through the use of an excess of the aluminum reactant as a neutralizing agent. The described sols are preferably prepared to contain less than about 14 wt. % aluminum, preferably from about 12 to about 14 wt. %, with an aluminum/chloride atom ratio of from about 1:1 to about 2:1. Generally, such sols will contain from about 8 to about 12 wt. % chloride.

As heretofore stated, the tin component is advantageously incorporated in the refractory inorganic oxide by the device of solubilizing a tin compound in the sol precursor of the desired refractory inorganic oxide carrier material. Thus, regardless of the method of sol preparation, a tin compound is solubilized therein prior to gelation. Suitable tin compounds include stannous chloride, stannous bromide, stannous fluoride, stannic chloride, stannic fluoride, stannic iodide, stannic sulfate, stannic chloride trihydrate, stannic chloride tetrahydrate, stannic chloride pentahydrate, stannic chloride diamine, stannic chromate, stannic tartrate, and the like. In some instances, as in the case of stannous chloride, it is desirable to add the tin compound to the sol in solution with a halogen acid to obviate hydrolysis and premature precipitation of the tin component resulting in a non-uniform dispersion thereof in the refractory inorganic oxide.

Gelation of the sol, containing the tin component dispersed therein, can be effected in any conventional or otherwise convenient manner. Preferably, gelation is effected under conditions to yield a carrier material having a surface area of from about 25 to about 500 m$^2$/gms. The better results are realized when the refractory inorganic oxide is alumina, with gamma-, theta-, and eta-alumina giving the best results. The carrier material preferably has an average bulk density of from about 0.30 to about 0.70 gms/cc, an average pore diameter of from about 20 to about 300 Angstroms, an average pore volume of from about 0.10 to about 1.0 cc/gm, and a surface area of from about 100 to about 500 m$^2$/gm. In general, the best results have been obtained with a spherical carrier material about 1/16 inch in diameter and comprising gamma-alumina, and having an average bulk density of about 0.5 gms/cc, a pore volume of about 0.4 cc/gm, and a surface area of about 175 m$^2$/gm.

A preferred method for effecting gelation which affords a convenient means of developing the desired physical characteristics of the carrier material relates to the well-known oil-drop method substantially as described by J. Hoekstra in U.S. Pat. No. 2,620,314. Accordingly, the tin-containing sol is admixed with a gelling agent at below gelation temperature, and the resulting mixture is dispersed as droplets in a hot oil bath whereby gelation occurs with the formation of firm spherical gel particles. The spherical gel particles are thereafter subjected to one or more aging treatments whereby desirable physical characteristics are imparted thereto. The gelling agent is suitably a weakly basic material substantially stable at normal temperatures but hydrolyzable to ammonia with increasing temperature. Hexamethylenetetramine is described as a most suitable gelling agent. Thus, the sol-hexamethylenetetramine mixture is dispersed as droplets, while still below gelation temperature, into the oil suspending medium which is maintained at an elevated temperature effecting hydrolysis of the hexamethylenetetramine and gelation of the tin-containing sol into firm spherical gel particles. The hexamethylenetetramine is suitably utilized in an amount to effect substantially complete neutralization of the acid anion, e.g. chloride anion, content of the sol. Only a fraction of a hexamethylenetetramine is hydrolyzed or decomposed in the relatively short period during which initial gelation occurs. During the subsequent aging process, the hexamethylenetetramine retained in the spheres continues to hydrolyze to ammonia, carbon dioxide and amines, effecting further polymerization whereby the pore characteristics of the carrier material are established. Generally, the gel particles are aged in the oil bath for a period of from about 10 to about 24 hours at a temperature of from about 50° to about 105° C., and thereafter washed, dried and calcined.

As previously stated, the foregoing method affords a convenient means of developing desired physical characteristics in the carrier material. The method includes a number of process variables which affect the spherical gel product. Generally, the metals/acid anion ratio of the sol will influence the average bulk density of the gel product and, correspondingly the pore diameter and pore volume characteristics attendant therewith — lower ratios tending toward higher average bulk densities. Other process variables affecting physical properties including the time, temperature and pH at which the gel particles are aged. Usually, temperatures in the lower range and shorter aging periods tend toward higher average bulk densities. Surface area is normally a function of calcination temperature, a temperature of from about 425° to about 815° C. being suitably employed.

Pursuant to the method of this invention, the calcined tin-containing refractory inorganic oxide is treated at a temperature of from about 50° to about 150° C. in contact with an aqueous solution of a basic reagent, said treatment being prior to the impregnation and/or ion exchange of the said support or carrier material with an acidic solution of a precursor compound of one or more catalytically active metallic components. The basic reagents herein contemplated include organic bases such as ethanolamine, butylamine, piperadine, pyridine, tetramethyl ammonium hydroxide, and the like, and also inorganic bases like ammonium hydroxide, sodium hydroxide, lithium hydroxide, potassium hydroxide, etc. An aqueous ammoniacal solution containing from about a 1 to about a 10 wt. % concentration of ammonia is a particularly useful reagent. The hydrothermal treatment is suitably effected over a period of from about 0.5 to about 5 hours — preferably in a closed vessel under autogenous pressure conditions. In any case, the treated carrier material is subsequently water-washed and impregnated with an acidic solution of a precursor compound of at least one catalytically active metallic component.

In keeping with the method of this invention, the tin-containing refractory inorganic oxide, treated with a basic reagent in the described manner, is impregnated with an acidic solution of a precursor compound of at least one catalytically active metallic material. The catalytic composite of this invention will typically comprise a metal, or an oxide or sulfide of a metal of the platinum sub-group of Group VIII, that is, platinum, palladium, rhodium, ruthenium, osmium and iridium, preferably platinum. The catalytic composite will preferably further comprise cobalt, or other metal of the iron sub-group of Group VIII, that is, iron and/or nickel. The tin-containing refractory inorganic oxide support is suitably impregnated utilizing impregnating techniques known to the art. For example, the support is suspended, soaked, dipped, or otherwise immersed in an acidic solution of a soluble precursor compound of a desired metallic component. Suitable precursor compounds of the platinum sub-group metallic components include platinum chloride, chloroplatinic acid, ammonium chloroplatinate, dinitrodiaminoplatinum, palladium chloride, chloropalladic acid, rhodium chloride, rhodium nitrate, rhodium sulfate, rhodium sulfite, ruthenium chloride, osmium chloride, iridium chloride, iridium sulfate, and the like. Suitable precursor compounds of the iron sub-group metallic components include cobalt chloride, cobalt nitrate, cobalt sulfate, nickel chloride, nickel nitrate, nickel sulfate, ferric chloride, and the like. The platinum group metallic component and the iron group metallic component can be impregnated on the support or carrier material from a common impregnating solution, or from separate impregnating solutions and in any sequence. Hydrochloric acid, or other halogen acid, is advantageously added to the impregnating solution to effect an optimum dispersion of the catalytically active metallic components over the available surface area of the tin-containing refractory inorganic oxide support, and also to promote the acidic function of the catalytic composite with respect to certain hydrocarbon conversion reactions. Preferably, the support is maintained in contact with the impregnating solution for a brief period, preferably for at least about 30 minutes, and the impregnating solution thereafter evaporated substantially to dryness. For example, a volume of tin-containing alumina particles is immersed in a substantially equal volume of impregnating solution in a steam jacketed rotary dryer and tumbled therein for a brief period at about room temperature. Steam is thereafter applied to the dryer jacket to expedite evaporation of the impregnating solution and the recovery of substantially dry impregnated material. Following impregnation, the resulting impregnated material is dried and subjected to high temperature calcination or oxidation. The impregnated material generally will be dried at a temperature of from about 95° to about 315° C. over a period of from about 2 to about 24 hours or more, and finally calcined at a temperature of from about 375° to about 595° C. in air for a period of from about 0.5 to about 10 hours in order to convert the metallic components thereof substantially to the oxide form.

The catalytic composite of this invention preferably comprises from about 0.01 to about 5.0 wt. % tin in from about a 0.1:1 to about a 3:1 atom ratio with the platinum group metal content thereof, although larger quantities up to about 30 wt. % may be employed. With regard to the iron group metal content, which is preferably cobalt, the catalytic composite preferably comprises from about 0.5 to about 5.0 wt. % thereof, calculated on an elemental basis.

While not essential, it is preferred that the resultant calcined catalytic composite be subjected to a substantially water-free reduction step prior to its use in the conversion of hydrocarbons. This step is designed to insure a uniform and finely divided dispersion of the metallic components without the carrier material. Preferably, substantially pure and dry hydrogen (i.e., less than 20 volume ppm $H_2O$) is used as the reducing agent in this step. The reducing agent is contacted with the calcined catalytic composite at a temperature of from about 425° to about 650° C. and for a period of from about 0.5 to about 10 hours or more effective to substantially reduce the metallic components of the elemental state. This reduction treatment may be performed in situ as part of a start-up sequence if precautions are taken to predry the plant to a substantially water-free state and a substantially water-free hydrogen is used.

The reduced catalytic composite, may, in some cases, be advantageously subjected to a presulfiding operation designed to incorporate in the catalytic composite from about 0.05 to about 0.50 wt. % sulfur, calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 10° to about 595° C. or more. It is generally a good practice to perform this presulfiding step under substantially water-free conditions.

The reforming of gasoline feed stocks in contact with the catalytic composite of this invention is suitably effected at a pressure of from about 50 to about 1000 psig and at a temperature of from about 425° to about 595° C. The catalyst of this invention permits a stable operation to be carried out in a preferred pressure range of from about 50 to about 350 psig. Similarly, the temperature required is generally lower than required for a similar reforming operation utilizing prior art reforming catalysts. Preferably, the temperature employed is in the range of from about 475° to about 575° C. Although the catalyst composition of this invention is most suitable for reforming, it may be used to promote other hydrocarbon conversion reactions including dehydrogenation, isomerization, destructive hydrogenation or hydrocracking, and oxidation to produce first, second and third stage oxidation products. Reaction conditions employed in the various hydrocarbon conversion reactions are those heretofore practiced in the art. For example, alkylaromatic isomerization reaction conditions include a temperature of from about 0° to about 535° C., a pressure of from about atmospheric to about 1500 psig, a hydrogen to hydrocarbon mole ratio of from about 0.5:1 to about 20:1 and a LHSV of from about 0.5 to about 20. Likewise, typical hydrocracking reaction conditions include a pressure of from about 500 to about 3000 psig, a temperature of from about 198° to about 500° C., a LHSV of from about 0.1 to about 10, and a hydrogen circulation rate of from about 1000 to about 10,000 SCF/BBL (standard cubic feet per barrel of charge).

The following examples are presented in illustration of the method of this invention and are not intended as an undue limitation on the generally broad scope of the invention as set out in the appended claims.

EXAMPLE I

In the preparation of a catalyst in accordance with prior art practice, an amount of stannic chloride, calculated to provide a catalytic composite containing 0.2 wt. % tin, was dissolved in an aluminum hydroxychloride sol containing 13.7 wt. % aluminum in a 1.15:1 ratio with the chloride anion content thereof. The mixture, with sufficient hexamethylenetetramine added thereto to effect a 200% neutralization of said chloride anion, was dispersed as droplets in a hot (95° C.) oil bath with the formation of spheroidal gel particles. The particles were allowed to age for about 8 hours in the hot oil bath, and then in an aqueous ammoniacal solution for about 3 hours. The particles were water-washed, dried and calcined for about 2 hours in air at 650° C. The calcined, tin-containing alumina spheres had an average bulk density of 0.482 grams per cubic centimeter.

EXAMPLE II

In the preparation of a catalyst in accordance with the method of this invention, the calcined spheres of Example I were further treated in contact with a 5 wt. % aqueous ammoniacal solution at about 110° C. in a closed vessel for approximately 2 hours, and then water-washed and dried at 95° C.

The tin-containing alumina spheres of Example I and the tin-containing alumina spheres of Example II were subsequently impregnated with a platinum component and a cobalt component, the resulting catalysts being hereinafter referred to as Catalyst "A" (Example I) and Catalyst "B" (Example II). The impregnation was in each case accomplished by conventional techniques. Thus, about 350 cc of the tin-containing alumina spheres were immersed in a 350 cc impregnating solution containing 52.5 cc of chloroplatinic acid (10 mg of Pt/cc), 35 cc of cobalt nitrate hexahydrate solution (50 mg Co/cc) and 8.8 cc of concentrated hydrochloric acid. The solution was then evaporated to dryness utilizing a rotary steam evaporator. The resulting composite was calcined in air for 1 hour at 150° C., and then for 2 hours at 525° C. during which time the chloride level was adjusted at about 1 wt. % by adding 0.9 M HCl to the calciner at the rate of 45 cc/hr. The composite was thereafter reduced in hydrogen at about 565° C. for 1 hour. The resulting catalytic composite in each case contained 0.2 wt. % tin, 0.3 wt. % platinum and 1.0 wt. % cobalt.

The catalysts thus prepared were evaluated in a laboratory scale reforming plant comprising a reactor, a high pressure-low temperature hydrogen separator and a debutanizer column. In the reforming operation, a hydrocarbon feed stock and a hydrogen-rich recycle stream were commingled and preheated to a temperature required to achieve and maintain a target octane number of 100 F-1 clear with respect to the $C_5$+ reformate product. The hydrocarbon feed stock was a gasoline fraction boiling in the 81°–191° C. range, said feed stock being characterized by an API at 60° F. of 59.7 and an F-1 clear octane rating of 41.0. The hydrocarbon-hydrogen mixture was charged down flow through a fixed catalyst bed contained in the reactor, and the reactor effluent was passed to the high pressure-low temperature separator wherein a hydrogen-rich gaseous phase was separated at a temperature of about 13° C. A portion of the gaseous phase was continuously withdrawn through a high surface area sodium scrubber and recycled substantially free of water to be commingled with the hydrocarbon feed stock, and the excess over that required to maintain plant pressure was recovered as excess separator gas. The high pressure-low temperature separator liquid phase was withdrawn in a continuous stream through a pressure reducing valve and charged to the debutanizer column where light ends were separated as an overhead fraction, and a $C_5$+ reformate product was recovered as the bottoms fraction.

The catalysts were in each case evaluated over eight test periods, each of which included a 12 hour line-out period followed by a 12 hour period during which the $C_5$+ product was collected and analyzed. Reaction conditions included a reactor outlet pressure of 300 psig, and a reactor inlet temperature which was continuously adjusted throughout the test in order to achieve and maintain a $C_5$+ target octane number of 100 F-1 clear. The hydrocarbon feed stock was charged to the reactor at a rate to effect a liquid hourly space velocity of about 3.0, and the hydrogen was recycled and commingled with the hydrocarbon feed stock at a rate to provide a hydrogen/hydrocarbon mole ratio of about 10:1.

The results of the separate tests performed on the preferred catalyst of the present invention, Catalyst "B", and the control catalyst, Catalyst "A", are presented for each test period in Table I in terms of the inlet temperature to the reactor necessary to achieve the target octane number, and the amount of $C_5$+ reformate recovered, expressed as liquid volume percent (LV%) of the charge stock.

TABLE I

| | Catalyst "A" | | Catalyst "B" | |
|---|---|---|---|---|
| Period | T, ° C. | $C_5$+, LV% | T, ° C. | $C_5$+, LV% |
| 1 | 517 | 69.2 | 509 | 69.8 |
| 2 | 518 | 69.7 | 511 | 68.5 |
| 3 | 520 | — | 511 | — |
| 4 | 522 | 70.2 | 514 | 69.1 |
| 5 | 525 | — | 514 | — |
| 6 | 526 | 69.9 | 515 | 69.2 |
| 7 | 527 | — | 516 | — |
| 8 | 528 | 71.3 | 517 | 69.2 |

The reactor inlet temperature required to produce a given octane rating is a good measure of catalyst activity. The data presented clearly show that Catalyst "B", prepared in accordance with the method of this invention was substantially more active than Catalyst "A" without any significant sacrifice of catalyst selectivity as evidenced by the $C_5$+ yields.

I claim as my invention:

1. A method of catalyst manufacture which comprises:
   a. treating a calcined tin-containing refractory inorganic oxide carrier material with an aqueous ammoniacal solution containing from about 1 to about 10 wt. % of ammonia at a temperature of 50° to about 150° C, for a time period of from about 0.5 to about 5 hours;
   b. water-washing and then drying the thus treated carrier material; and
   c. subsequently compositing a Group VIII metal catalyst with the washed and dried tin-containing carrier material.

2. The method of claim 1 further characterized in that said refractory inorganic oxide carrier material is alumina.

3. The method of claim 1 further characterized in that said refractory inorganic oxide contains from about 0.01 to about 5.0 wt. % tin.

4. The method of claim 1 further characterized in that said tin-containing refractory inorganic oxide is a tin-containing alumina formed by digesting aluminum in aqueous hydrochloric acid at conditions to provide a hydrosol containing aluminum in from about a 1:1 to about a 1.5:1 atom ratio with the chloride anion content thereof; solubilizing stannic chloride in said hydrosol; commingling the sol at below gelation temperature with sufficient hexamethylenetetramine to effect substantially complete neutralization of the chloride anion content thereof; dispersing the mixture as droplets in a hot oil bath effecting hydrolysis of said hexamethylenetetramine and the formation of spheroidal gel particles: and calcining said particles at a temperature of from about 425° to about 815° C.

5. The method of claim 1 further characterized in that said Group VIII metal catalyst comprises a platinum group metal in the elemental or oxide or sulfide form.

6. The method of claim 5 further characterized in that said catalyst additionally comprises an iron group metal.

7. The method of claim 1 further characterized in that said Group VIII metal catalyst comprises platinum and cobalt.

8. The method of claim 1 further characterized in that step (c) comprises an impregnation of the carrier material with chloroplatinic acid and cobalt nitrate, followed by calcination.

* * * * *